US009342590B2

(12) United States Patent
Karidi et al.

(10) Patent No.: US 9,342,590 B2
(45) Date of Patent: May 17, 2016

(54) KEYWORDS EXTRACTION AND ENRICHMENT VIA CATEGORIZATION SYSTEMS

(75) Inventors: Ron Karidi, Herzeliya (IL); Liat Segal, Holon (IL); Oded Elyada, Tel Aviv (IL); Rotem Bennett, Kerem Maharal (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 779 days.

(21) Appl. No.: 12/978,169

(22) Filed: Dec. 23, 2010

(65) Prior Publication Data

US 2012/0166441 A1    Jun. 28, 2012

(51) Int. Cl.
G06F 17/30 (2006.01)

(52) U.S. Cl.
CPC .................................. G06F 17/3071 (2013.01)

(58) Field of Classification Search
CPC ................................................... G06F 17/3071
See application file for complete search history.

(56) References Cited

U.S. PATENT DOCUMENTS

| | | | |
|---|---|---|---|
| 6,446,061 B1 * | 9/2002 | Doerre et al. | 707/738 |
| 6,751,600 B1 * | 6/2004 | Wolin | 706/12 |
| 7,047,236 B2 * | 5/2006 | Conroy et al. | |
| 7,085,771 B2 * | 8/2006 | Chung et al. | |
| 7,899,816 B2 * | 3/2011 | Kolo et al. | 707/729 |
| 2005/0234953 A1 * | 10/2005 | Zhang et al. | 707/101 |
| 2006/0089924 A1 * | 4/2006 | Raskutti et al. | 707/1 |
| 2006/0143175 A1 * | 6/2006 | Ukrainczyk et al. | 707/6 |
| 2006/0242147 A1 * | 10/2006 | Gehrking et al. | 707/7 |
| 2006/0294085 A1 * | 12/2006 | Rose | G06F 17/30616 |
| 2007/0100813 A1 * | 5/2007 | Davies et al. | 707/5 |
| 2008/0120292 A1 * | 5/2008 | Sundaresan et al. | 707/5 |
| 2009/0319555 A1 * | 12/2009 | Ragno | G06F 17/30011 |
| 2010/0094875 A1 | 4/2010 | Harrison et al. | |
| 2012/0296902 A1 * | 11/2012 | Deolalikar et al. | 707/737 |

OTHER PUBLICATIONS

Al-Hashemi, Rafeeq, "Text Summarization Extraction System (TSES) Using Extracted Keywords", Retrieved at <<http://www.iajet.org/webfile/current_1.4_2010/Text Summarization Extraction System (TSES) Using Extracted Keywords_doc.pdf >>, International Arab Journal of e-Technology, vol. 1, No. 4, Jun. 2010, pp. 164-168.

(Continued)

*Primary Examiner* — Shew-Fen Lin
(74) *Attorney, Agent, or Firm* — Alin Corie; Sandy Swain; Micky Minhas

(57) ABSTRACT

Techniques for determining a set of keywords associated with a document are provided. A document is received that may be classified into a taxonomy that includes a plurality of categories. A categorization ranking is determined for each category for the received document. A set of categories of the taxonomy having highest categorization rankings is determined for the received document. Documents representing the set of categories having highest categorization rankings are combined together into a cumulative representative text that includes a plurality of terms. A cumulative term corpus importance score is determined for each term in the cumulative representative text. The cumulative term corpus importance score for a particular term indicates an importance of the particular term in a context of the cumulative representative text. A set of terms of the cumulative representative text having highest cumulative term corpus importance scores is selected to be keywords for the received document.

20 Claims, 7 Drawing Sheets

(56) References Cited

OTHER PUBLICATIONS

Wenliang, et al., "Automatic Word Clustering for Text Categorization Using Global Information", Retrieved at <<http://www.nlplab.cn/chenwl/papers/chenwl_airs04.pdf >>, 2004, pp. 6.

Hedstrom, Anna, "Question categorization for a question answering system using a vector space model", Retrieved at << http://citeseerx.ist.psu.edu/viewdoc/download?doi=10.1.1.118.9263&rep=rep1&type=pdf >>, 2005, pp. 46.

Ueda, et al., "Evaluation of the Document Categorization in "Fixed-point Observatory"", Retrieved at << http://research.nii.ac.jp/ntcir/workshop/OnlineProceedings5/data/PATENT/NTCIR5-PATENT-UedaY.pdf >>, Proceedings of NTCIR-5 Workshop Meeting, Dec. 6-9, 2005,, pp. 5.

"Categorization and Extraction", Retrieved at << http://perl.find-info.ru/perl/025/advperl2-chp-5-sect-4.html >>, Retrieved Date: Oct. 1, 2010 , pp. 7.

"AlchemyAPI", Retrieved at << http://www.alchemyapi.com/ >>, Mar. 11, 2010, pp. 2.

"Hierarchical Content Classification Into Deep Taxonomies" U.S. Appl. No. 12/777,260, filed May 11, 2010, pp. 26.

* cited by examiner

700

702 — count a number of occurrences of each term in the category and any sub-categories of the category to generate a first count for each term 704 — determine a total number of words in the category and any sub-categories of the category 706 — divide the first count for each term by the total number of words to generate a term frequency for each term 708 — determine a number of categories of the taxonomy in which each term is included to generate a category number total for each term 710 — divide a total number of categories of the taxonomy by the category number total for each term to generate an inverse category frequency for each term 712 — multiply, for each term, the term frequency by the inverse category frequency to generate a term corpus importance score

FIG. 7

802 — combine, for each term, term corpus importance scores generated for the term for categories of the set of categories to determine a cumulative term corpus importance score

FIG. 8

KEYWORDS EXTRACTION AND ENRICHMENT VIA CATEGORIZATION SYSTEMS

BACKGROUND

Various techniques exist for classifying documents into one or more categories. For instance, some classification techniques may compare words included in a document to words associated with categories of a taxonomy to classify the document in one or more of the categories of the taxonomy. Examples of documents that may be classified in this manner include documents generated using a word processor, emails, web pages, and further types of documents. The ability to classify documents may have a variety of purposes, such as determining relevance for advertising and/or search.

For instance, a user may provide a particular document. The contents of the document may provide some indication of the user's interests (e.g., likes and dislikes, etc.). If the document can be classified into one or more categories based on words included in the document, advertisements associated with the one or more categories may be selected and directed to the user. Because the selected advertisements are associated with the categories of interest to the user, the advertisements are likely to be of interest to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for determining keywords that represent the content of a document. The determined keywords may include one or more words that were included in the document, and one or more words that were not included in the document. The keywords may be tagged to the document, included in the document, used to select advertisements, used as suggested search terms, and/or may be used in further ways.

For instance, implementations are described for determining a set of keywords associated with a document. A document is received that may be classified into a taxonomy. The taxonomy includes a plurality of categories. Each of the categories is represented by a concatenation of a corresponding set of documents. A categorization ranking is determined for each category for the received document. A set of categories of the taxonomy having highest categorization rankings is determined for the received document. The documents representing the determined set of categories are combined together into a cumulative representative text that includes a plurality of terms. A cumulative term corpus importance score is determined for each term in the cumulative representative text. The cumulative term corpus importance score for a particular term indicates an importance of the particular term in a context of the cumulative representative text. A set of terms of the cumulative representative text having highest cumulative term corpus importance scores is selected. The selected set of terms of the cumulative representative text may be used as keywords associated with the received document.

In one implementation, a cumulative term corpus importance score may be determined for each term in the cumulative representative text. For instance, for each category: a number of occurrences of each term in the category and any sub-categories of the category may be determined to generate a first count for each term; a total number of words in the category and any sub-categories of the category may be determined; the first count for each term may be divided by the total number of words in the category to generate a term frequency for each term; a number of categories of the taxonomy in which each term is included may be determined to generate a category number total for each term; a total number of categories of the taxonomy may be divided by the category number total for each term to generate an inverse category frequency for each term; and for each term, the term frequency may be multiplied by the inverse category frequency to generate a term corpus importance score. Furthermore, for each term, the term corpus importance scores generated for the term for categories of the set of categories may be combined to determine the cumulative term corpus importance score.

In another implementation, a system is described for determining a set of keywords associated with a document. The system includes a document classifier, a category combiner, an importance score determiner, and a keyword selector. The document classifier receives a document, determines a categorization ranking for the received document for each category of a taxonomy, and determines a set of categories of the taxonomy having highest categorization rankings for the received document. The category combiner combines together the documents representing the determined set of categories into a cumulative representative text that includes a plurality of terms. The importance score determiner determines a cumulative term corpus importance score for each term in the cumulative representative text. The cumulative term corpus importance score for a particular term indicates an importance of the particular term in a context of the cumulative representative text. The keyword selector selects a set of terms of the cumulative representative text having highest cumulative term corpus importance scores to be keywords for the received document.

In one implementation, the system further includes a recursive term counter, a word counter, a term frequency generator, a category number total generator, an inverse category frequency generator, and a term corpus importance score generator. For each category: the recursive term counter counts a number of occurrences of each term in the category and any sub-categories of the category to generate a first count for each term. The word counter determines a total number of words in the category and any sub-categories of the category. The term frequency generator divides the first count for each term by the total number of words to generate a term frequency for each term. The category number total generator determines a number of categories of the taxonomy in which each term is included to generate a category number total for each term. The inverse category frequency generator divides a total number of categories of the taxonomy by the category number total for each term to generate an inverse category frequency for each term. For each term of each category, the term corpus importance score generator multiplies the term frequency by the inverse category frequency to generate a term corpus importance score.

The importance score determiner may include an importance score combiner that, for each term, combines the term corpus importance scores generated for the term to determine the cumulative term corpus importance score.

Computer program products are also described herein for determining keywords for a document, for using the determined keywords to select advertisements, for using the determined keywords as suggested search terms, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7 shows a flowchart providing a process for generating term corpus importance scores for terms on a category-by-category basis, according to an example embodiment.

FIG. 8 shows a process for combining term corpus importance scores to generate cumulative term corpus importance scores, according to an example embodiment.

Figures 1, 2:
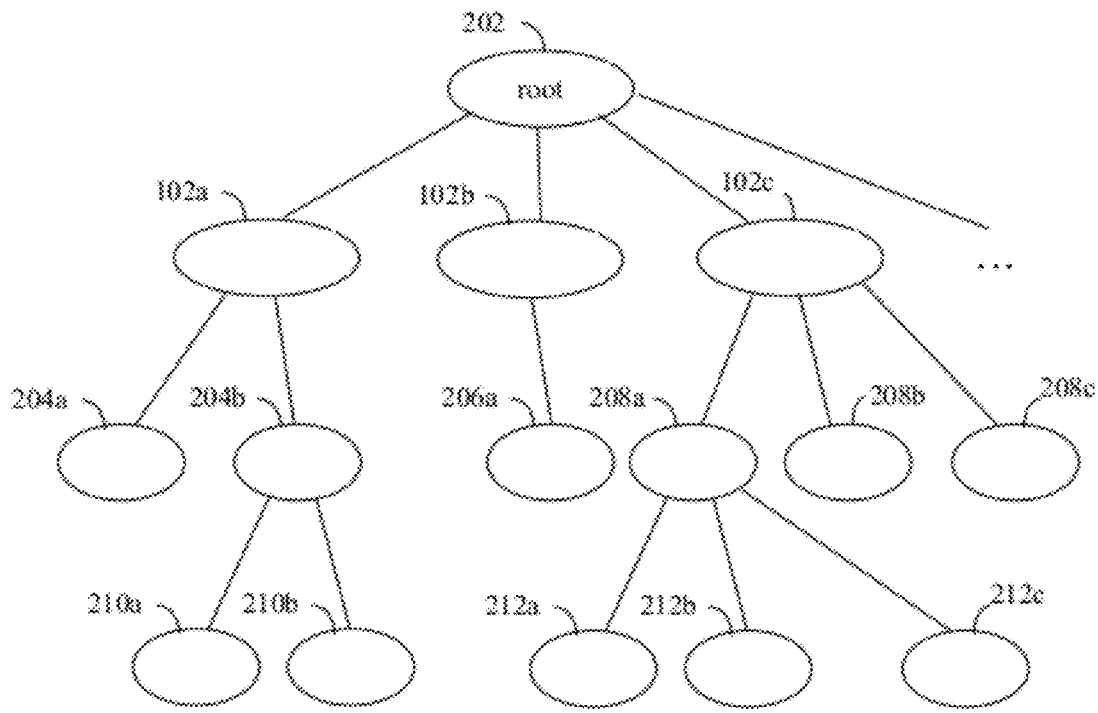
FIG. 1 shows an example of a taxonomy, according to an embodiment.
FIG. 2 shows an example of a hierarchical taxonomy, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Embodiments provide techniques for determining keywords that represent the content of a document. The determined keywords may include one or more words that were included in the document and one or more words that were not included in the document. The determination of keywords not included in the document may have various benefits and uses. For instance, the keywords may be inserted into the document, or tagged to the document (e.g., added to metadata associated with the document by a tagging module). Such keywords may be used to select advertisements for display to a user, to provide suggestions of keywords that can be entered as search queries to a search engine, and/or for other purposes. The determined keywords not included in the document may represent the content of the document, and may be used to enrich a list of keywords that are included in the document, and thus are already associated with the document.

For instance, with regards to advertising, a user may select and/or provide a particular document. The contents of the document may provide some indication of the user's interests (e.g., likes and dislikes, etc.). The document may be classified into one or more categories. According to embodiments, keywords may be determined based on the categories. Advertisements may be selected and directed to the user based on the determined keywords. Because the determined keywords may include some keywords that are not included in the document, the advertisements selected based on the determined keywords may include advertisements that would not have been selected based only on the actual words contained in the document. As such, a greater range of advertisements may be selected for display to the user relative to techniques that select advertisements based upon the actual words contained in the document.

Moreover, in a further embodiment, a list of keywords may be associated with the user over time, based on the techniques described herein, aggregating the variety of documents viewed by the user, and further aggregating the meta-data associated with ads that the user has interacted with.

In another example, in the context of online search, a user may enter a first set of search queries to obtain a search result that includes one or more documents. The user may select one of the documents for viewing, indicating an interest in the document. The document may be classified into one or more categories, and according to embodiments, keywords may be determined based on the categories. Search queries may be selected and directed to the user based on the determined keywords. The search queries may include some keywords not included in the document, and thus may provide search queries of relevance to the user that the user may not have otherwise thought of.

Embodiments may relate to classification systems, which perform classifications of documents. In a classification system, a document may be classified by comparing the words in the document to the words included in categories (or classifications) of a taxonomy, which is itself a classification. For instance, FIG. 1 shows an example of a taxonomy 100, according to an embodiment. As shown in FIG. 1, taxonomy 100 includes a plurality of categories 102a-102n. Any number of categories 102 may be present, including hundreds of categories, thousands of categories, hundreds of thousands of categories, millions of categories, etc. Furthermore, each category 102 includes a corresponding document set 104. For example, as shown in FIG. 1, first category 102a includes a first document set 104a, second category 102b includes a second document set 104b, third category 102c includes a third document set 104c, etc. Any number of documents may be included in each document set 104, including tens of documents, hundreds of documents, thousands of documents, hundreds of thousands of documents, millions of documents, etc. Furthermore, documents included in one document set 104 may be included in other document sets 104. Examples of documents that may be included in documents sets 104 include documents generated using word processors, emails, web pages, etc.

In the embodiment of FIG. 1, taxonomy 100 is shown as being a flat structure, such that none of categories 102a-102n is shown having sub-categories. In embodiments, taxonomy 100 may be a classification arranged in a hierarchical structure such that one or more categories 102 may have sub-categories. For instance, FIG. 2 shows a hierarchical taxonomy 200, according to an example embodiment. In FIG. 2, taxonomy 200 is shown in a tree structure of classifications. At the top of the tree structure of taxonomy 200 is a single classification, which is referred to as a root node 202. Categories 102a-102c (and potentially further categories 102) are shown connected to root node 202 as child nodes. Each of categories 102a-102c have corresponding sub-categories, with category 102a being a parent node connected to sub-categories 204a and 204b as child nodes, category 102b being a parent node connected to sub-category 206a as a child node, and category 102c being a parent node connected to sub-categories 208a-208c as child nodes. Sub-categories may have respective sub-categories, which may have further sub-categories, such that any number and levels of sub-categories may be present in the tree structure of taxonomy 200. For instance, as shown in FIG. 2, sub-category 204b is a parent node connected to sub-categories 210a and 210b as child nodes, and sub-category 208a is a parent node connected to sub-categories 212a-212c as child nodes.

Categories below root node 202 are more specific categories or classifications that include subsets of the total set of classified documents of taxonomy 200. Taxonomy 200 progresses from general categories to more specific categories as the tree structure of taxonomy 200 is traversed from root node 202 downward to other categories/nodes. A taxonomy may be generated for any subject matter, and many taxonomies that classify documents in categories exist. Embodiments of the present invention are applicable to any such taxonomies. For instance, one example taxonomy that is publicly available and Internet-accessible is provided at www.dmoz.org (by Netscape Communications of Mountain View, Calif.) as the Open Directory Project (ODP). The ODP provides a hierarchical taxonomy of categories for web page listings by HTML. The categories are arranged in a hierarchical tree structure that is interconnected by hypertext transfer markup language links. The ODP is provided as an example taxonomy, and is not intended to be limiting.

A classification system that maintains a taxonomy, such as taxonomies 100 and/or 200, may receive a document, and classify the document into one or more of the categories of the taxonomy. According to embodiments, keywords that represent the content of the document may be determined based on the document. The keywords may be determined based on categories in which the document is classified. The determined keywords may include at least some keywords that are not included in the words of the document.

Figure 3:
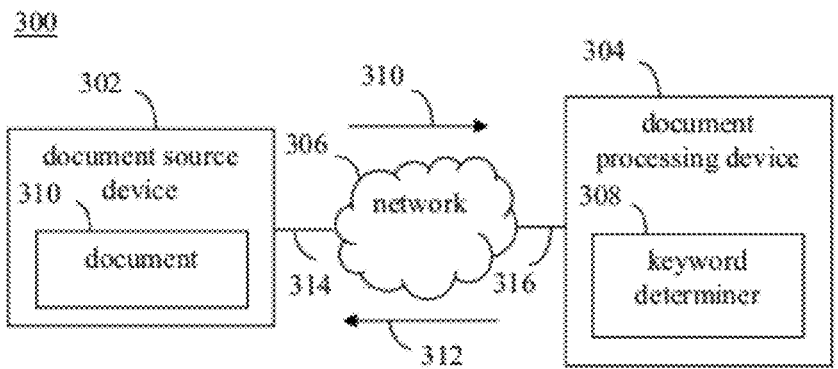
FIG. 3 shows a document classification system, according to an example embodiment.

For instance, FIG. 3 shows a document classification system 300, according to an example embodiment. Embodiments for determining keywords may be implemented in classification systems such as system 300 or in other types of systems. As shown in FIG. 3, system 300 includes a document source device 302, a document processing device 304, and a network 316. System 300 is described as follows to illustrate the determination of keywords for a document in a classification system.

Document source device 302 may be any type and/or configuration of a device capable of providing a document 310 to document processing device 304 for processing (e.g., for categorization, for keyword determination, etc.). For instance, document source device 302 may be a computer of a web-user, may include a web service that supplies web pages and/or other documents to users, may be a repository for documents, such as email mailboxes, etc.

Document source device 302 may be any type of computing device, including a desktop computer (e.g., a personal computer, etc.), a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), a server, or other type of computing device. Document processing device 304 may include one or more servers, and/or any other type of computing device described herein or otherwise known that enables processing of documents as described herein. Device 302 and device 304 are communicatively coupled by network 306. Network 306 may include one or more communication links and/or communication networks, such as a PAN (personal area network), a LAN (local area network), a WAN (wide area network), or a combination of networks, such as the Internet. First and second communication links 314 and 316, which respectively couple device 302 and device 304 to network 306, may include any number of communication links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

Figure 4:
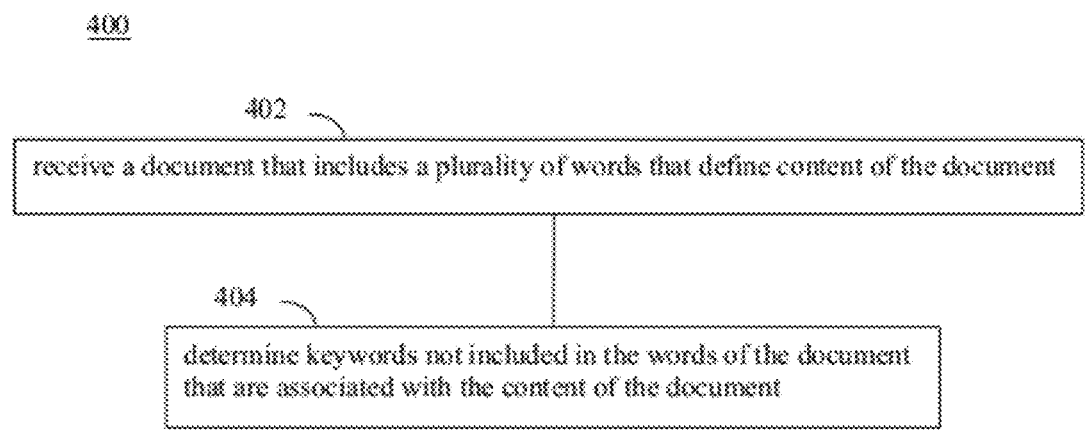
FIG. 4 shows a flowchart providing a process for determining keywords for a document, according to an example embodiment.

System 300 is further described as follows with respect to FIG. 4. FIG. 4 shows a flowchart 400 providing a process for determining keywords for a document, according to an example embodiment. In an embodiment, document processing device 304 may operate according to flowchart 400. Further structural and operational embodiments will be apparent to persons skilled in the relevant art(s) based on the discussion regarding flowchart 400. Flowchart 400 and system 300 are further described as follows.

Flowchart 400 begins with step 402. In step 402, a document is received that includes a plurality of words that define content of the document. For example, as shown in FIG. 3, document source device 302 includes a document 310 (e.g., in storage associated with device 302). Document source device 302 may transmit document 310 to document processing device 304 to classify document 310 and/or to have keywords generated that are representative of document 310. For instance, device 302 may transmit document 310 due to user interaction with document 310 (e.g., in a web browser or other application running in device 302) at device 302, due to operation of a web service at device 302, due to operation of a document repository at device 302, or due to other application running at device 302. As shown in FIG. 3, document 310 is transmitted from device 302 in a first communication signal through first communication link 314, network 306, and second communication link 316, to be received by document processing device 304. The first communication signal may be transmitted in any form.

In step 404, keywords not included in the words of the document are determined that are associated with the content of the document. Document processing device 304 may be configured to perform classification of document 310, in an embodiment. As shown in FIG. 3, device 304 may include a keyword determiner 308. Keyword determiner 308 is configured to generate keywords for document 310 based at least on the content of document 310. The generated keywords may include one or more words not included in document 310, and may include one or more words that are included in document 310. In an embodiment, keyword determiner 308 may transmit the determined keywords to document source device 302 as keywords 312. Keywords 312 are transmitted in a second communication signal from document processing device 304. The second communication signal is transmitted through second communication link 316, network 306, and first communication link 314, and is received by document source device 302. The second communication signal may be transmitted in any form.

Note that although document 310 is shown being received by document processing device 304 from document source device 302 in FIG. 3, in another embodiment, document 310 may be stored at document processing device 304, and may be submitted to keyword determiner 308 by a user interacting with document processing device 304.

Keywords 312 may be used in various ways. For instance, keywords 312 may be inserted in document 310, tagged to document 310 (e.g., inserted into metadata associated with document 310), provided to document source device 302 as suggested search terms for a user at device 302, used as a search query to generate search results, used to select one or more advertisements that are transmitted to device 302 for display to a user, and/or used in other ways.

Figure 5:
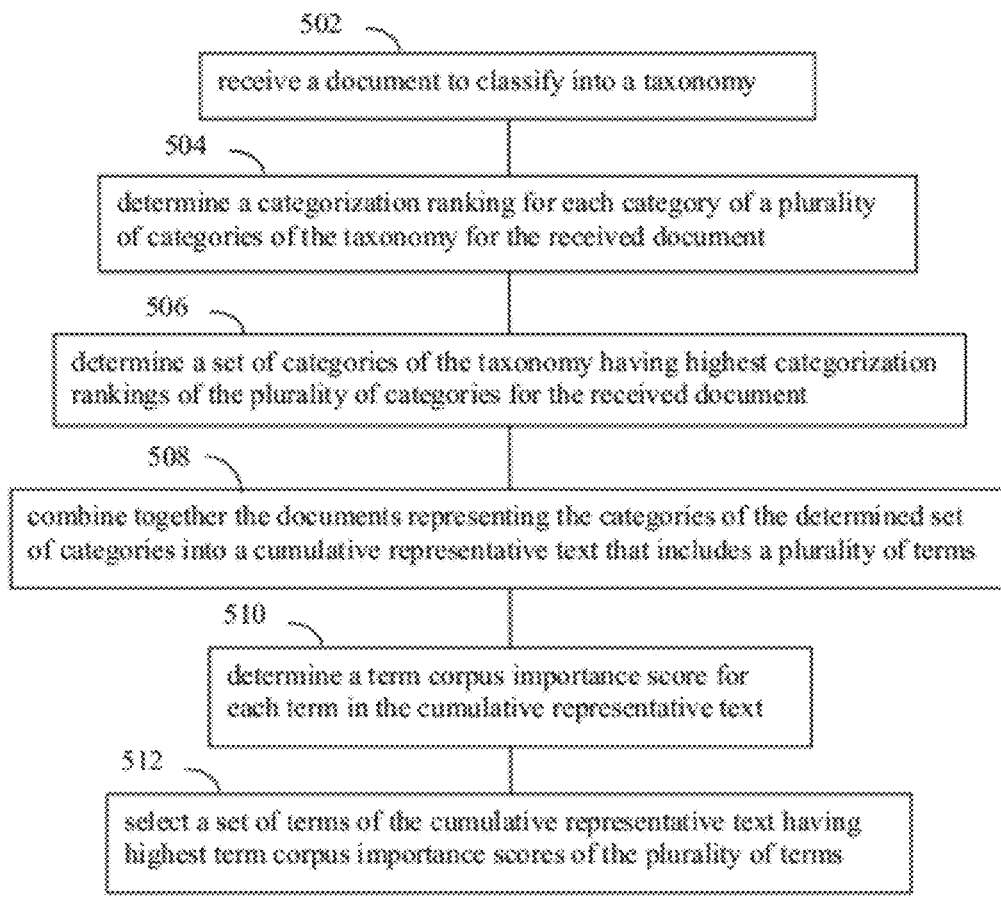
FIG. 5 shows a flowchart that is an example embodiment of the flowchart of FIG. 4.
Figure 6:
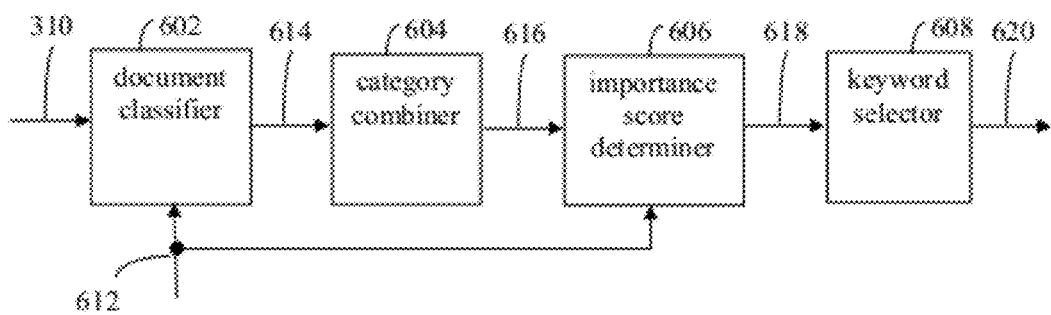
FIG. 6 shows a block diagram of a keyword determiner, according to an example embodiment.

Keyword determiner 308 may perform keyword determination (e.g., step 404 of flowchart 400) in various ways, in embodiments. For instance, FIG. 5 shows a flowchart 500 providing a process for determining keywords, according to an example embodiment. In an embodiment, keyword determiner 308 may operate according to flowchart 500. Further structural and operational embodiments will be apparent to persons skilled in the relevant art(s) based on the discussion regarding flowchart 500. For instance, FIG. 6 shows a block diagram of a keyword determiner 600, according to an example embodiment. Keyword determiner 600 is an example of keyword determiner 308 of FIG. 3. As shown in FIG. 6, keyword determiner 600 includes a document classifier 602, a category combiner 604, an importance score determiner 606, and a keyword selector 608. Flowchart 500 is described with respect to keyword determiner 600 of FIG. 6 for purposes of illustration. Flowchart 500 and keyword determiner 600 are further described as follows.

Flowchart 500 begins with step 502. In step 502, a document is received to classify into a taxonomy. For example, as shown in FIG. 6, document 310 is received by document classifier 602. Document 310 may be any type of document that includes at least some text, such as a document generated in a word processor, an email or other type of electronic message, a web page (e.g., a news article, a sports article, a blog page, etc.), a tweet® (associated with Twitter Inc. of San Francisco, Calif.), and further types of documents. Document 310 may have any textual content, depending on the particular document.

For instance, for the purposes of illustration, a text of an example of document 310 is shown as follows:

Hi,

I want to share with you the great trip to France I just returned from. I visited Orleans, in the Loire valley. It is fascinating. The wine country, the gastronomy, the medieval castles, the scenery and people!

The Loire river is beautiful and surrounded by wonderful chateaux and gorgeous boutique wineries. It was an extraordinary vacation!

I think you have mentioned going to France a while back. You may actually want to do it!

As shown above, the example document text includes a plurality of words, such as "France," "Orleans," "Loire," "wine," etc. The example document text (referred to hereinafter as "France trip text") includes content that relates to a trip to France by the writer of the text. As mentioned above, this example text is provided for purposes of illustration, and is not intended to be limiting.

In step 504, a categorization ranking is determined for each category of a plurality of categories of the taxonomy for the received document. For example, as shown in FIG. 6, document classifier 602 receives or accesses a plurality of categories 612. Categories 612 may be categories of a taxonomy (e.g., similar to categories 102a-102n of taxonomies 100 and 200 described above). In an embodiment, document classifier 602 may determine categorization rankings for each of categories 612 for document 310. In other words, document classifier 602 may generate a plurality of classification rankings corresponding to categories 612 for document 310. For categories of categories 612 that document 310 is more closely related, the corresponding categorization rankings generated by document classifier 602 are relatively higher. For categories of categories 612 that document 310 is less closely related, the corresponding categorization rankings generated by document classifier 602 are relatively lower. The generated categorization rankings may have any form, including a numerical form. For instance, the categorization rankings may have values in the range of 0.0 to 1.0, with higher classification rankings having values approaching 1.0, and lower classification rankings having values approaching 0.0.

Document classifier 602 may generate classification rankings for each of categories 612 for document 310 in any manner, including according to numerous classification techniques known to persons skilled in the relevant art(s). In one example embodiment, document classifier 602 may generate classification rankings according to the techniques described in pending U.S. application Ser. No. 12/777,260, titled "Hierarchical Content Classification into Deep Taxonomies," filed May 11, 2010, which is incorporated by reference herein in its entirety (hereinafter "the '260 application"). In the '260 application, a document may be classified by traversing a hierarchical classification tree and comparing the words in the document to words in documents representing the nodes on the classification tree. According to the '260 application, the document may be classified by traversing the classification tree and generating a comparison score based on word comparisons. The score may be used to trim the classification tree or to advance to another node on the tree. According to the '260 application, the score may be based on a scarcity or importance of individual words in the document compared to the scarcity or importance of words in the category. According to the '260 application, the result may be a set of classifications with scores for those classifications.

In further embodiments, other techniques for generating classification rankings for categories with respect to a document may be used, as would be known to persons skilled in the relevant art(s). Note that in an alternative embodiment, rather than determining categorization rankings using document classifier 602, categorization rankings for categories 612 may instead be predetermined, and may be received by document classifier 602. In such an embodiment, document classifier 602 does not need to be configured to determine categorization rankings. Thus, in such an embodiment, step 504 may be a step of receiving a categorization ranking for each category of a plurality of categories of the taxonomy for the received document.

In an embodiment, the categories of categories 612 may each be represented by a concatenation of the corresponding set of documents of the category. For example, in an embodiment, document classifier 602 may perform the concatenation of the documents of each category. This concatenation of documents for each category may be referred to as a "representative text" or a "bag of words" corresponding to each category. The bag of words may include all of the "words" or "terms" in the corresponding set of documents, or a subset of all of the "words" or "terms" of the corresponding set of documents, with or without regard to order. For instance, in an embodiment, a bag of words for a category may include words of the category having importance scores meeting predetermined importance criteria, such that words having importance scores that do not meet the predetermined importance criteria are filtered out. For instance, words may be filtered out such as "the", "and", "a", and/or further articles, conjunctions, and/or other words that do not substantially contribute to the subject matter content of documents/categories. Further words may be filtered out based on predetermined importance criteria, as would be known to persons skilled in the relevant art(s). In many embodiments, the "words" or "terms" included in a "bag of words" may be a unigram, bigram, trigram, or other group of string elements. The various n-grams may refer to character strings or word strings. In some cases, the "words" or "terms" may be portions of words, such as prefixes, roots, and suffixes. Throughout this specification and claims, the word "term" shall be construed to be a string of characters, which may be a subset of a unigram or may be a bigram, trigram, or other n-gram, and may also include word strings or phrases.

In step 506, a set of categories of the taxonomy having highest categorization rankings of the plurality of categories for the received document is determined In an embodiment, document classifier 602 selects a set of the categories of categories 612 that include the highest classification rankings determined for document 310. For instance, document classifier 602 may select a predetermined number of the top ranked categories (e.g., the 3 categories that have the 3 highest classification rankings). As shown in FIG. 6, document classifier 602 outputs matching set of categories 614, which includes the determined top ranked categories.

For instance, with respect to the France trip text example shown above, three categories having the highest classification rankings may be selected. Examples of the three categories, their respective classification rankings ("CR", shown in the first row), and their respective representative texts/bags of words (in subsequent rows) are shown as follows in Table 1:

TABLE 1

| Category X (CR = 0.4713) | Category Y (CR = 0.4563) | Category Z (CR = 0.4491) |
|---|---|---|
| Mayenne | Loire | Loire |
| Loire | Mayenne | Orleans |
| Orleans | mediate | food |
| Food | wine | valley |
| France | Orleans | scenery |
| castles | France | . . . |
| trip | food | |
| . . . | castles | |
| | . . . | |

These example classification rankings and examples of representative text are provided for purposes of illustration, and are not intended to be limiting.

In step 508, the documents representing the categories of the determined set of categories are combined into a cumulative representative text that includes a plurality of terms. For example, as shown in FIG. 6, category combiner 604 receives matching set of categories 614. Category combiner 604 is configured to combine the categories of matching set of categories 614 to form a cumulative representative text 616.

For instance, in an embodiment, category combiner 604 may concatenate or append together the texts of each of the categories of matching set of categories 614 into a single representative text as cumulative representative text 616. In one embodiment, category combiner 604 may combine one copy of each of the categories of matching set of categories 614 into cumulative representative text 616. In another embodiment, copies of the categories of matching set of categories 614 may be combined into cumulative representative text 616 according to one or more scaling factors based on the classification rankings determined by document classifier 602. For instance, the words/text of a category having a higher classification ranking may be weighted higher (e.g., scaled using a scaling factor greater than 1.0), and the words of a category having a lower classification ranking may be weighted lower (e.g. scaled using a scaling factor less than 1.0). For example, words of a first category having a classification ranking twice as high as the classification ranking of a second category may each be entered into cumulative representative text 616 twice (a scaling factor of 2), while words of the second category may be entered into cumulative representative text 616 once. Thus, words of a first category having a relatively high classification ranking may be entered into cumulative representative text 616 more than one time each (e.g., may be multiplied by a scaling factor that is an integer or non-integer). In this manner, the words of the first category have increased importance, and/or increased chance or likelihood that they will appear in cumulative representative text 616.

In step 510, a cumulative term corpus importance score for each term in the cumulative representative text is determined For example, as shown in FIG. 6, importance score determiner 606 receives categories 612 and cumulative representative text 616. Importance score determiner 606 is configured to determine a cumulative term corpus importance score for each term in cumulative representative text 616. A cumulative term corpus importance score for a particular term indicates an importance of the particular term in a context of cumulative representative text 616 and the taxonomy. Such a cumulative term corpus importance score may be determined in various ways. Examples for determining cumulative term corpus importance scores are described below. The cumulative term corpus importance scores may have any form, including a numerical form. For instance, the cumulative term corpus importance scores may have values in the range of 0.0 to 1.0, with scores indicating higher importance having values approaching 1.0, and scores indicating lower importance having values approaching 0.0. As shown in FIG. 6, importance score determiner 606 generates cumulative term corpus importance scores 618 corresponding to the terms in cumulative representative text 616.

In step 512, a set of terms of the cumulative representative text having highest cumulative term corpus importance scores of the plurality of terms is determined For example, as shown in FIG. 6, keyword selector 608 receives cumulative term corpus importance scores 618. Keyword selector 608 is configured to select a set of the terms of cumulative representative text 616 that have the highest scores of cumulative term corpus importance scores 618. For instance, keyword selector 608 may select a predetermined number of the terms having the top scores of scores 618 (e.g., the five terms having the five highest scores). As shown in FIG. 6, keyword selector 608 outputs top set of terms 620, which includes the terms of cumulative representative text 616 having the highest scores of cumulative term corpus importance scores 618.

For example, with respect to the France trip text example shown above, an example of cumulative representative text 616 is shown in a first column of a Table 2 below, and the corresponding cumulative term corpus importance scores 616 are shown in the second column of Table 2:

TABLE 2

| cumulative representative text | cumulative term corpus importance scores |
|---|---|
| castles | 0.5515 |
| Loire | 0.5121 |
| Mayenne | 0.3221 |
| France | 0.2354 |
| Orleans | 0.1927 |
| mediate | 0.1688 |
| wine | 0.1277 |
| food | 0.0959 |
| valley | 0.0848 |
| trip | 0.0827 |
| scenery | 0.0811 |
| ... | ... |

In this example, keyword selector 608 is configured to select the four terms of cumulative representative text 616 having the top scores of scores 618. In this example, keyword selector 608 selects the top four terms listed in Table 2, as shown in Table 3 below:

TABLE 3

| top set of terms |
|---|
| castles |
| Loire |
| Mayenne |
| France |

In this example, keyword selector 608 outputs the terms "castle," "Loire," "Mayenne," and "France" as top set of terms 610.

As such, keyword determiner 600 enables a list of keywords to be determined—top set of terms 610—that generalize the concepts of document 610. Furthermore, some of the generated keywords may not be included in document 610. In this manner, keywords are generated that enable various uses, such as advertisement selection and/or suggested search query generation as described above, that are not available when only keywords that already exist in document 610 are used. Any number of keywords may be generated that are not included in document 610, according to embodiments.

For instance, in the France trip text example described above, the keywords "castle," "Loire," "Mayenne," and "France" were generated as top set of terms 610. The keywords "Loire," "castle," and "France" are present in the example France trip text. However, the keyword "Mayenne" is not present in the example France trip text. As such, the additional keyword of "Mayenne" is generated that may be used as a suggested search term (e.g., provided by a search engine), may be used to select advertisements (e.g., by an advertisement selector/server, alone or in combination with the other keywords), may be inserted into or tagged to the France trip text, and/or may be used in further ways.

As described above, in step 510, a cumulative term corpus importance score for each term in the cumulative representative text is determined As shown in FIG. 6, importance score determiner 606 receives categories 612 and cumulative representative text 616, and generates cumulative term corpus importance scores 618. Cumulative term corpus importance scores 618 may be determined in various ways.

For instance, various features may be generated for terms included in categories based on the vocabulary of the categories and on received document 310. Such features may be associated with the terms as attributes that describe the commonality and/or importance of the terms with respect to the categories of a taxonomy. Examples of such features are listed and described as follows.

Term count (non recursive): the non-recursive term count is the number of occurrences of each word in a category (not counting the words in its sub-categories).

Term count (recursive): the recursive term count is the number of occurrences of each word in a category and its sub-categories.

Term frequency (TFc,t): the term frequency is the recursive term count for a term t in a category c divided by the number of words in the category c and its sub-categories. The term frequency represents the local importance to a term to a particular category.

Inverse category frequency (ICFt): the inverse category frequency is the total number of categories (Nc) divided by the number of categories in which the term t appears. The inverse category frequency is related to the global prevalence of the term t in the language (as it is represented by the corpus or entire taxonomy).

Term corpus importance score (TFc,t×ICFt): the term corpus importance score (non-cumulative) for a term t of a category c is the term frequency for the term t in the category c multiplied by the inverse category frequency for the term t. The term corpus importance score is used for evaluating how important a term is to the category in the context of the corpus. The importance of a term increases proportionally to the number of times it appears in the category but is offset by the frequency of the term in the entire corpus.

In embodiments, document classifier 602 and/or importance score determiner 606 may generate one or more of these features. For instance, as described above, importance score determiner 606 may generate the cumulative term corpus importance score for each term of each category of matching set of categories 614 in which document 310 was classified by document classifier 602. Importance score determiner 606 may generate the cumulative term corpus importance score for a term as a combination of term corpus importance score features determined for the term. In some embodiments, document classifier 602 may have generated some of the above described features that importance score determiner 606 uses to generate the cumulative term corpus importance scores, or the features may all be generated by importance score determiner 606. The generated cumulative term corpus importance scores may be output as cumulative term corpus importance scores 618, and may be used as keywords for document 310.

In an embodiment, step 510 may be performed according to FIGS. 7 and 8. FIG. 7 shows a flowchart 700 providing a process for generating term corpus importance scores for terms on a category-by-category basis, according to an example embodiment. Furthermore, FIG. 8 shows a step 802 for a process for combining term corpus importance scores for terms to generate cumulative term corpus importance scores, according to an example embodiment. In embodiments, document classifier 602 and/or importance score determiner 606 may perform flowchart 700 of FIG. 7, and importance score determiner 606 may perform step 802 of FIG. 8. Further structural and operational embodiments will be apparent to persons skilled in the relevant art(s) based on the discussion regarding flowchart 700 and step 802.

Figure 9:
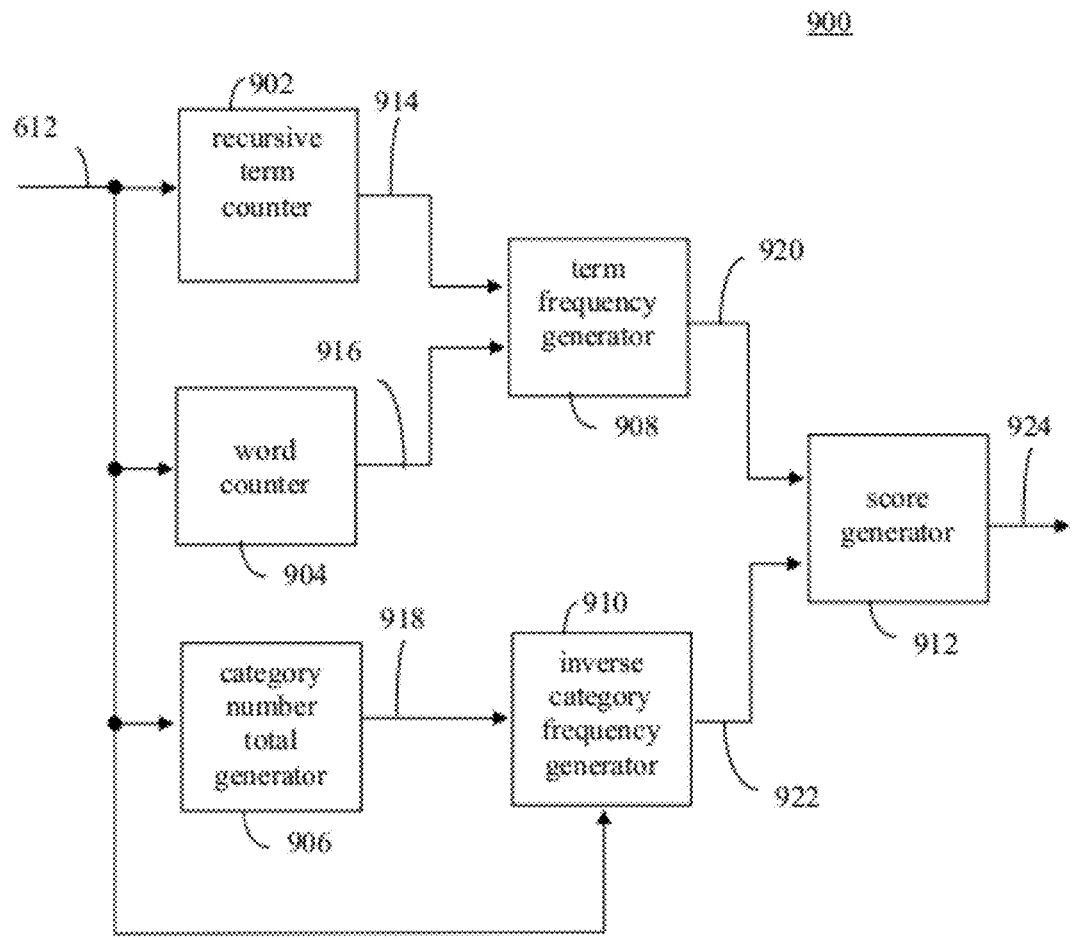
FIG. 9 shows a block diagram of a feature generator, according to an example embodiment.

FIG. 7 is described as follows, followed by a description of FIG. 8. Flowchart 700 is described as follows with respect to FIG. 9 for purposes of illustration. FIG. 9 shows a block diagram of a feature generator 900, according to an example embodiment. Feature generator 900 may be included in document classifier 602 or in importance score determiner 606 to determine term corpus importance scores. As shown in FIG. 9, feature generator 900 includes a recursive term counter 902, a word counter 904, a category number total generator 906, a term frequency generator 908, an inverse category frequency generator 910, and a score generator 912. Flowchart 700 and feature generator 900 are further described as follows.

Flowchart 700 is performed at least for each category of matching set of categories 614. For example, with regard to the France trip text example described above, flowchart 700 may be performed for each of categories X, Y, and Z shown in Table 1. Alternatively, flowchart 700 may be performed for each category of a taxonomy. For instance, document classifier 602 may perform all or a portion of flowchart 700 for each category of categories 612 when classifying document 310 (e.g., during step 504 of flowchart 500 in FIG. 5). As such, in either case, flowchart 700 is described as follows in terms of being performed for a category, and may be repeated for each category.

Flowchart 700 begins with step 702. In step 702, a number of occurrences of each term in the category and any sub-categories of the category is counted to generate a first count for each term. For instance, as shown in FIG. 9, recursive term counter 902 receives categories 612. Recursive term counter 902 is configured to generate the recursive term count feature described above. In an embodiment, for a category of categories 612, recursive term counter 902 counts a number of occurrences of each term of the category and any sub-categories of the category to generate a first count for each term. As shown in FIG. 9, recursive term counter 902 outputs first counts 914, which includes recursive term counts for the terms of the category being processed.

In step 704, a total number of words in the category and any sub-categories of the category is determined For example, as shown in FIG. 9, word counter 904 receives categories 612. Word counter 904 is configured to count the total number of words in a category of matching set of categories 614 and any sub-categories of the category. As shown in FIG. 9, word counter 904 outputs a category word total 916, which includes the counted total number of words of the category being processed. In an embodiment, the total number of words of categories may be predetermined.

In step 706, the first count for each term is divided by the total number of words in the category and any sub-categories of the category to generate a term frequency for each term. For instance, as shown in FIG. 9, term frequency generator 908 receives first counts 914 and category word total 916. Term frequency generator 908 is configured to generate the term frequency feature described above. In an embodiment, for each term of a category, term frequency generator 908 divides the first count of first counts 914 by category word total 916 to generate a corresponding term frequency. As shown in FIG. 9, term frequency generator 908 outputs term frequencies 920, which includes term frequencies for the terms of the category being processed.

In step 708, a number of categories of the taxonomy in which each term is included is determined to generate a category number total for each term. For example, as shown in FIG. 9, category number total generator 906 receives matching set of categories 614. For each term, category number total generator 906 is configured to determine a total number of categories (a "category number total") of categories 612 that include the term. As shown in FIG. 9, category number total generator 906 outputs category number totals 918, which includes category total numbers generated for the term of the category being processed.

In step 710, a total number of categories of the taxonomy is divided by the category number total for each term to generate an inverse category frequency for each term. For instance, as shown in FIG. 9, inverse category frequency generator 910 receives categories 612 and category number totals 918. Inverse category frequency generator 910 is configured to generate the inverse category frequency feature described above. Inverse category frequency generator 910 is configured to determine a total number of categories in categories 612, and for each term, to divide the determined total number of categories by the category total number in category number totals 918 for the term, to generate an inverse category frequency for each term. As shown in FIG. 9, inverse category frequency generator 910 outputs inverse category frequencies 922, which includes the inverse category frequencies generated for the terms of the category being processed.

In step 712, for each term, the term frequency is multiplied by the inverse category frequency to generate a term corpus importance score. For example, as shown in FIG. 9, score generator 912 receives term frequencies 920 and inverse category frequencies 922. Score generator 912 is configured to generate the term corpus importance score feature described above. For each term, score generator 924 is configured to multiply the term frequency of term frequencies 920 by the inverse category frequency of inverse category frequencies 922 to generate a term corpus importance score for the term. As shown in FIG. 9, score generator 912 outputs term corpus importance scores 924, which includes the term corpus importance scores generated for the terms of the category being processed.

As such, according to flowchart 700, term corpus importance score features may be generated for each term of each category of matching set of categories 614. Such term corpus importance scores are non-cumulative. In an embodiment, the term corpus importance scores generated for a particular term across all of matching set of categories 614 may be combined to generate a cumulative term corpus importance score for the term. In this manner, cumulative term corpus importance scores may be generated for each term of cumulative representative text 616.

Figure 10:
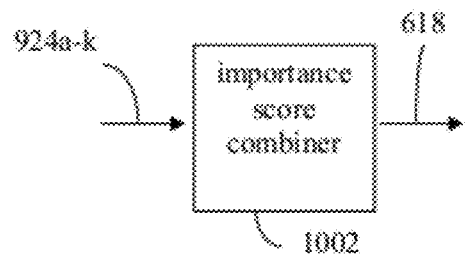
FIG. 10 shows a block diagram of an importance score combiner, according to an embodiment.

For instance, FIG. 8 shows a step 802 for generating cumulative term corpus importance scores, according to an example embodiment. In step 802, for each term, the term corpus importance scores generated for the term for categories of the set of categories are combined to determine the cumulative term corpus importance score. For example, FIG. 10 shows a block diagram of an importance score combiner 1002, according to an embodiment. Importance score combiner 1002 may be configured to perform step 802. As shown in FIG. 10, importance score combiner 1002 receives term corpus importance scores 924a-k. Term corpus importance scores 924a-k includes term corpus importance scores generated for each of the "k" categories included in matching set of categories 614. For each term, importance score combiner 1002 may combine (e.g., add together) the term corpus importance scores of term corpus importance scores 924a-k that are generated for the term to determine the cumulative term corpus importance score for the term. As shown in FIG. 10, importance score combiner 1002 outputs cumulative term corpus importance scores 618, which includes the cumulative term corpus importance score 618 generated for each term. Because cumulative term corpus importance scores 618 include scores generated for terms of matching set of categories 614, cumulative term corpus importance scores 618 include scores generated for the terms of cumulative representative text 616, as described above with reference to FIG. 6.

For instance, referring to categories X, Y, and Z with regard to the France trip text example described above. The term "Mayenne" may have a term corpus importance score generated for each of categories X and Y, the term "Loire" may have a term corpus importance score generated for each of categories X, Y, and Z, etc. The term corpus importance scores generated for "Mayenne" for each of categories X and Y may be combined (e.g., added together) to generate the cumulative term corpus importance score for "Mayenne" (e.g., 0.3221 shown in Table 2). The term corpus importance scores generated for "Loire" for each of categories X, Y, and Z may be combined to generate the cumulative term corpus importance score for "Loire" (e.g., 0.5121 shown in Table 2). The term corpus importance scores generated for further terms of categories X, Y, and Z may be combined to generate the cumulative term corpus importance score for the further terms. As described above with respect to keyword selector 608 of FIG. 6 and step 512 of FIG. 5, a set of terms of cumulative representative text 616 that have the highest term corpus importance scores may be selected as keywords 620.

Figure 11:
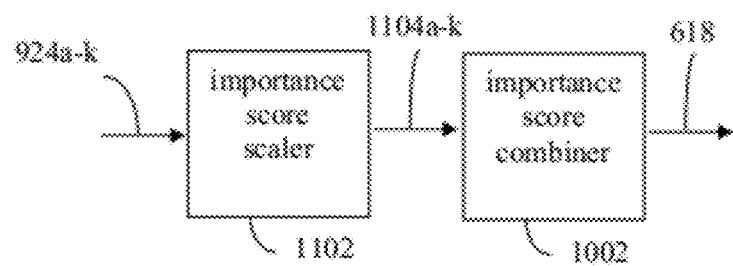
FIG. 11 shows a block diagram of an importance score scaler and an importance score combiner, according to an embodiment.

Note that in an embodiment, term corpus importance scores generated for terms may be weighted based on the relevance of the category for which the scores are generated. For instance, FIG. 11 shows a block diagram of an importance score scaler 1102 and importance score combiner 1002 of FIG. 10, according to an embodiment. In an embodiment, importance score scaler 1102 may apply a weight to term corpus importance scores before they are cumulated by importance score combiner 1002. As shown in FIG. 11, importance score scaler 1102 receives term corpus importance scores 924a-k. Furthermore, importance score scaler 1102 may receive classification rankings generated by document classifier 602 for categories 310. Importance score scaler 1102 may apply a weight (e.g., scale factor) to term corpus importance scores for terms based upon the category for which the term corpus importance scores were generated. For instance, importance score scaler 1102 may be configured to increase a weight of term corpus importance scores for terms of a first category based on a relatively higher categorization ranking of the first category, and to decrease a weight of a term corpus importance scores for terms of a second category based on a relatively lower categorization ranking of the second category.

As shown in FIG. 11, importance score scaler 1102 outputs weighted term corpus importance scores 1104a-k, which includes weighted term corpus importance scores generated for each of the "k" categories included in matching set of categories 614. Importance score combiner 1002 receives weighted term corpus importance scores 1104a-k. For each term, importance score combiner 1002 may combine (e.g., add together) the weighted term corpus importance scores of weighted term corpus importance scores 1104a-k that are generated for the term to determine the cumulative term corpus importance score for the term. As shown in FIG. 10, importance score combiner 1002 outputs cumulative term corpus importance scores 618, which includes the weighted cumulative term corpus importance scores 618 generated for each term.

III Example Computing Device Embodiments

Keyword determiner 308, keyword determiner 600, document classifier 602, category combiner 604, importance score determiner 606, keyword selector 608, recursive term counter 902, word counter 904, category number total generator 906, term frequency generator 908, inverse category frequency generator 910, score generator 912, importance score combiner 1002, and importance score scaler 1102 may be implemented in hardware, software, firmware, or any combination thereof For example, keyword determiner 308, keyword determiner 600, document classifier 602, category combiner 604, importance score determiner 606, keyword selector 608, recursive term counter 902, word counter 904, category number total generator 906, term frequency generator 908, inverse category frequency generator 910, score generator 912, importance score combiner 1002, and/or importance score scaler 1102 may be implemented as computer program code configured to be executed in one or more processors. Alternatively, keyword determiner 308, keyword determiner 600, document classifier 602, category combiner 604, importance score determiner 606, keyword selector 608, recursive term counter 902, word counter 904, category number total generator 906, term frequency generator 908, inverse category frequency generator 910, score generator 912, importance score combiner 1002, and/or importance score scaler 1102 may be implemented as hardware logic/electrical circuitry.

Figure 12:
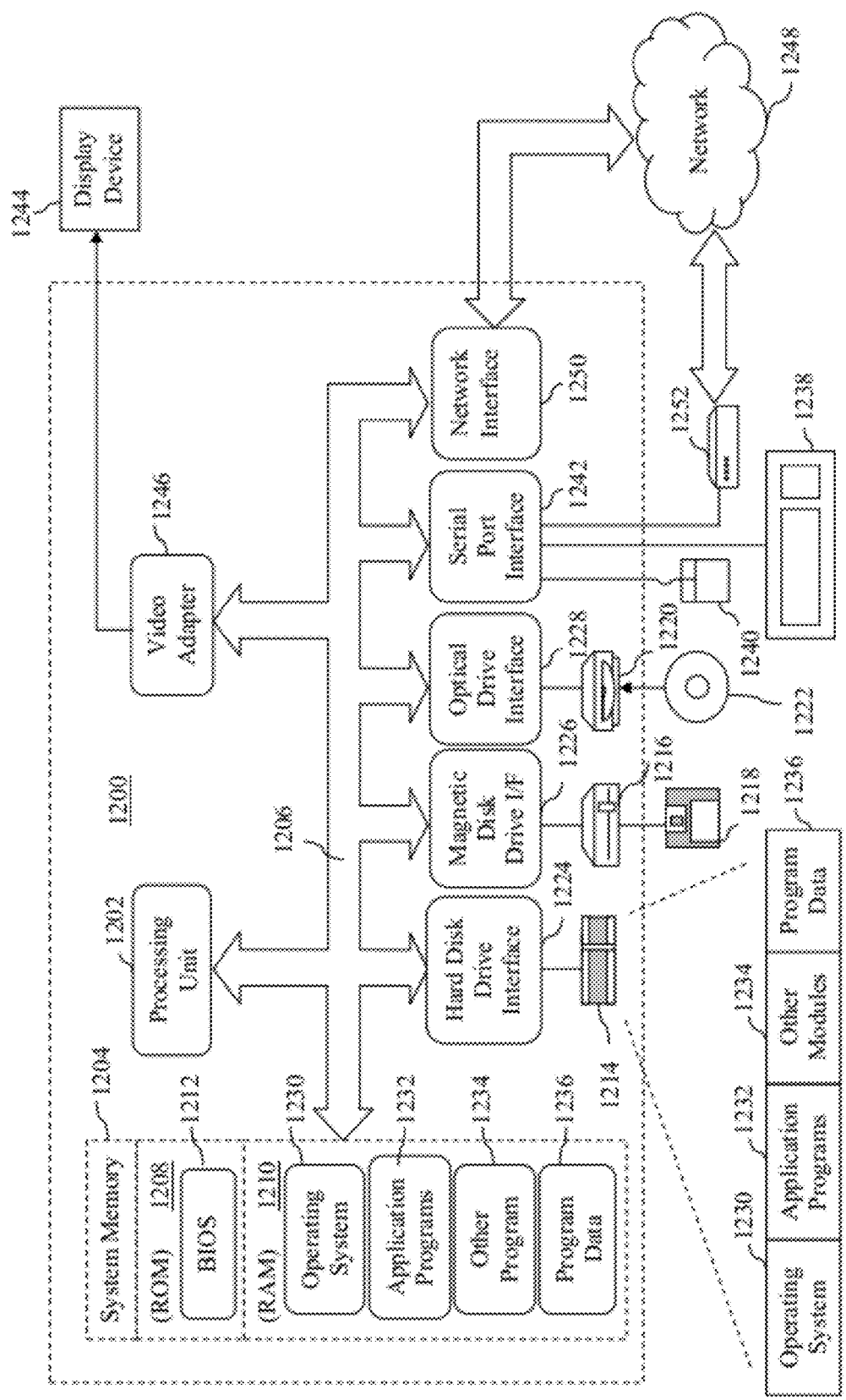
FIG. 12 shows a block diagram of an example computer that may be used to implement embodiments of the present invention.

FIG. 12 depicts an exemplary implementation of a computer 1200 in which embodiments of the present invention may be implemented. For example, document source device 302 and/or document processing device 304, may be implemented in one or more computer systems similar to computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments of the present invention may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing keyword determiner 308, keyword determiner 600, document classifier 602, category combiner 604, importance score determiner 606, keyword selector 608, recursive term counter 902, word counter 904, category number total generator 906, term frequency generator 908, inverse category frequency generator 910, score generator 912, importance score combiner 1002, importance score scaler 1102, flowchart 400, flowchart 500, flowchart 700, step 802, (including any step of flowcharts 400, 500, and 700), and/or further embodiments described herein.

A user may enter commands and information into the computer 1200 through input devices such as keyboard 1238 and pointing device 1240. Other input devices (not shown) may include a microphone, joystick, game pad, satellite dish, scanner, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 is also connected to bus 1206 via an interface, such as a video adapter 1246. In addition to the monitor, computer 1200 may include other peripheral output devices (not shown) such as speakers and printers.

Computer 1200 is connected to a network 1248 (e.g., the Internet) through an adaptor or network interface 1250, a modem 1252, or other means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to media such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments of the present invention discussed herein. Accordingly, such computer programs represent controllers of the computer 1200.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method on a first computing device for determining a set of keywords associated with a document for use as suggested search terms, comprising:

receiving from a second computing device via a network a document to classify into a taxonomy, the taxonomy including a plurality of categories, each category of the plurality of categories being represented by a concatenation of a corresponding set of documents;

determining a categorization ranking for each category of the plurality of categories for the received document;

determining a set of categories of the taxonomy having highest categorization rankings of the plurality of categories for the received document;

combining together, using one or more processors, the documents representing the categories of the determined set of categories within the taxonomy into a cumulative representative text that includes a plurality of terms;

determining a term corpus importance score for each term in the cumulative representative text for each category of the set of categories based on a term frequency and an inverse category frequency;

determining a cumulative term corpus importance score for each term in the cumulative representative text by combining the term corpus importance scores generated for each term for categories of the set of categories, the cumulative term corpus importance score for a particular term indicating an importance of the particular term in a context of the cumulative representative text;

selecting a set of terms of the cumulative representative text having highest cumulative term corpus importance scores of the plurality of terms as the keywords, the set of terms including at least one term that is not included in the received document; and providing one or more of the keywords as one or more suggested search terms to the second computing device via the network.

2. The method of claim 1, wherein each category of the plurality of categories is represented as a subset of all the words of the corresponding concatenated set of documents, the subset including words having importance scores meeting predetermined importance criteria.

3. The method of claim 1, wherein said combining comprises:

applying a scaling factor to words of a first category of the set of categories having a categorization ranking that is greater than at least one other category of the set of categories to increase a likelihood that the words of the first category appear in the cumulative representative text and/or an importance of the words.

4. The method of claim 1, wherein at least some of the categories have one or more corresponding sub-categories, wherein said determining a cumulative term corpus importance score for each term in the cumulative representative text further comprises:

using a hierarchy of categories in a tree of classifications to determine cumulative term corpus importance scores.

5. The method of claim 1, wherein at least some of the categories have one or more corresponding sub-categories, wherein said determining a cumulative term corpus importance score for each term in the cumulative representative text further comprises:

for each category,
counting a number of occurrences of each term in the category and any sub-categories of the category to generate a first count for each term,
dividing the first count for each term by a total number of words in the category and any sub-categories of the category to generate the term frequency for each term,
determining a number of categories of the taxonomy in which each term is included to generate a category number total for each term,
dividing a total number of categories of the taxonomy by the category number total for each term to generate the inverse category frequency for each term, and
for each term, multiplying the term frequency by the inverse category frequency to generate the term corpus importance scores.

6. The method of claim 5, wherein said determining a cumulative term corpus importance score for each term in the cumulative representative text further comprises:

for each term,
weighting each term corpus importance score generated for the term based on the categorization ranking of the category for which the term corpus importance score was generated to generate weighted term corpus importance scores, and combining the weighted term corpus importance scores generated for the term to determine the cumulative term corpus importance score for the term.

7. A system for determining a set of keywords associated with a document for use as suggested search terms, comprising:

a processor; and
a memory containing a program, which, when executed by the processor, is configured to perform a process configured to:

receive a categorization ranking for a document received from a device via a network for each category of a plurality of categories of a taxonomy, and determine a set of categories of the taxonomy having highest categorization rankings of the plurality of categories for the received document;

combine together the documents representing the categories of the determined set of categories into a cumulative representative text that includes a plurality of terms, the plurality of terms including at least one term that is not included in the received document;

determine a term corpus importance score for each term in the cumulative representative text for each category of the set of categories based on a term frequency and an inverse category frequency;

determine a cumulative term corpus importance score for each term in the cumulative representative text by combining the term corpus importance scores generated for each term for categories of the set of categories, the cumulative term corpus importance score for a particular term indicating an importance of the particular term in a context of the cumulative representative text;

select a set of terms of the cumulative representative text having highest cumulative term corpus importance scores of the plurality of terms as the keywords; and provide one or more of the keywords as one or more suggested search terms to the device via the network.

8. The system of claim 7, wherein each category of the plurality of categories is represented as a subset of all the words of the corresponding concatenated set of documents, the subset including words having importance scores meeting predetermined importance criteria.

9. The system of claim 7, wherein the process is further configured to apply a scaling factor to words of a first category of the set of categories having a categorization ranking that is greater than at least one other category of the set of categories to increase a likelihood that the words of the first category appear in the cumulative representative text and/or an importance of the words.

10. The system of claim 7, wherein at least some of the categories have one or more corresponding sub-categories, wherein the process is further configured to use a hierarchy of categories in a tree of classifications to determine cumulative term corpus importance scores.

11. The system of claim 7, wherein the process is further configured to, for each category, count a number of occurrences of each term in the category and any sub-categories of the category to generate a first count for each term, divide the first count for each term by a total number of words in the category and any sub-categories of the category to generate the term frequency for each term, determine a number of categories of the taxonomy in which each term is included to generate a category number total for each term, divide a total number of categories of the taxonomy by the category number total for each term to generate the inverse category frequency for each term, and, for each term of each category, multiply the term frequency by the inverse category frequency to generate the term corpus importance score.

12. The system of claim 11, wherein:
the process is further configured to, for each term, weight each term corpus importance score generated for the term based on the categorization ranking of the category for which the term corpus importance score was generated to generate weighted term corpus importance scores, and
for each term, combine the weighted term corpus importance scores generated for the term to determine the cumulative term corpus importance score for the term.

13. A computer program product comprising a computer-readable storage medium having computer program code recorded thereon for determining a set of keywords associated with a document for use as suggested search terms, the computer program code comprising:
first computer program code that enables a processor to receive a categorization ranking for a document received from a device via a network for each category of a plurality of categories of a taxonomy, and to determine a set of categories of the taxonomy having highest categorization rankings of the plurality of categories for the received document;
second computer program code that enables a processor to combine together the documents representing the categories of the determined set of categories into a cumulative representative text that includes a plurality of terms, the plurality of terms including at least one term that is not included in the received document;
third computer program code that enables a processor to determine a term corpus importance score for each term in the cumulative representative text for each category of the set of categories based on a term frequency and an inverse category frequency, and determine a cumulative term corpus importance score for each term in the cumulative representative text by combining the term corpus importance scores generated for each term for categories of the set of categories, the cumulative term corpus importance score for a particular term indicating an importance of the particular term in a context of the cumulative representative text;
fourth computer program code that enables a processor to select a set of terms of the cumulative representative text having highest cumulative term corpus importance scores of the plurality of terms as the keywords; and
fifth computer program code that enables a processor to provide one or more of the keywords as one or more suggested search terms to the device via the network.

14. The computer program product of claim 13, wherein each category of the plurality of categories is represented as a subset of all the words of the corresponding concatenated set of documents, the subset including words having importance scores meeting predetermined importance criteria.

15. The computer program product of claim 13, wherein said second computer program code comprises:
computer program code that enables a processor to apply a scaling factor to words of a first category of the set of categories having a categorization ranking that is greater than at least one other category of the set of categories to increase a likelihood that the words of the first category appear in the cumulative representative text and/or an importance of the words.

16. The computer program product of claim 13, further comprising:
sixth computer program code that enables a processor to, for each category, count a number of occurrences of each term in the category and any sub-categories of the category to generate a first count for each term,
seventh computer program code that enables a processor to, for each category, divide the first count for each term by a total number of words in the category and any sub-categories of the category to generate a term frequency for each term,
eighth computer program code that enables a processor to, for each category, determine a number of categories of the taxonomy in which each term is included to generate a category number total for each term,
ninth computer program code that enables a processor to, for each category, divide a total number of categories of the taxonomy by the category number total for each term to generate the inverse category frequency for each term, and
tenth computer program code that enables a processor to, for each category, multiply the term frequency by the inverse category frequency for each term to generate the term corpus importance score.

17. The computer program product of claim 16, wherein said third computer program code comprises:
computer program code that enables a processor to, for each term, weight each term corpus importance score generated for the term based on the categorization ranking of the category for which the term corpus importance score was generated to generate weighted term corpus importance scores, and
computer program code that enables a processor to, for each term, combine the weighted term corpus importance scores generated for the term to determine the cumulative term corpus importance score for the term.

18. The method of claim 1, wherein the at least one term that is not included in the received document is tagged to the received document.

19. The system of claim 7, wherein the keywords include at least one term that is not included in the received document.

20. The computer program product of claim 13, wherein the keywords include at least one term that is not included in the received document.

* * * * *